UNITED STATES PATENT OFFICE.

GEORG KRÄNZLEIN, OF SINDLINGEN, NEAR HOCHST-ON-MAIN, AND MARTIN CORELL, OF HOCHST-ON-MAIN, GERMANY, ASSIGNORS TO FARBWERKE VORM. MEISTER LUCIUS & BRÜNING, OF HOCHST-ON-MAIN, GERMANY, A CORPORATION OF GERMANY.

ESTERS OF DIOXYDIETHYLSULPHIDE AND PROCESS OF MAKING SAME.

1,422,869.     Specification of Letters Patent.     Patented July 18, 1922.

No Drawing.     Application filed July 2, 1921. Serial No. 482,151.

*To all whom it may concern:*

Be it known that we, GEORG KRÄNZLEIN and MARTIN CORELL, citizens of Germany, residing at Sindlingen, near Hochst-on-Main and Hochst-on-Main, Germany, respectively, have invented certain new and useful Improvements in Esters of Dioxydiethylsulphide and Processes of Making Same (for which I have made application in Germany, January 20, 1919, and June 12, 1920), of which the following is a specification.

We have found that by heating dioxydiethyl sulphide with organic or inorganic acids there are obtained esters of the dioxydiethylsulphide. The term "acids" also comprises those compounds containing hydroxyl which, like aluminium-hydroxide, are of a very weakly acid and amphoteric character. Particularly in the case of using inorganic acids care must be taken to choose such mild conditions that the formation of diethyleneoxide sulphide, which easily forms from the dioxydiethyl sulphide by closing the ring, is avoided. The products thus obtained are useful in the manufacture of films etc. as a softening agent, and as pharmaceutical products.

The following examples illustrate the invention, the parts being by weight:

1. 6 parts of acetic anhydride are heated to about 120° in a reflux apparatus and there are then slowly added by drops 5 parts of dioxydiethyl sulphide. When the reaction has terminated the mixture is subjected to distillation in a vacuum, whereby there are distilled over at about 142–150° under a pressure of 12 mm. besides a small quantity of first runnings, more than 5 parts of the new diethylester.

The liquid thus obtained, which is limpid like water, but unlike the parent material does not mix with water, gives the following analysis figures:

| Found. | Calculated for $C_8H_{14}O_4S$. |
|---|---|
| S=15.73% | S=15.5% |
| C=46.61% | C=46.6% |
| H=6.99% | H=6.79% |

The acetyl ester may also be produced by using glacial acetic acid or more dilute acetic acid in a manner similar to that indicated in example 2 for formic acid.

2. One part of dioxydiethyl sulphide is heated for 3 hours in a reflux apparatus with 5 parts of formic acid of 90 per cent strength, whereupon the excess of formic acid is distilled off in an apparatus with a descending condenser. The remaining diformyl ester, which is insoluble in water, distills over at 130–137° under a pressure of 7 mm. with an almost quantitative yield.

By using in example 1 instead of acetic anhydride another anhydride, such, for instance, as benzoic anhydride or phthalic anhydride the corresponding esters are obtained.

3. 244 parts of thiodiglycol are heated in a vacuum with 2,000 parts of sulfuric acid double normal so that the water distills off. There remains a gum-like residue which may be easily triturated so as to form a white amorphous mass of voluminous and elastic quality. The sulfuric ester thus obtained may be isolated by stirring it with water or alcohol. When this ester is allowed to stand with water for a longer time, it turns into a jelly-like form. By subjecting it to reaction with, for instance, a carbonate or a hydroxide, the corresponding salts of the thiohydrine-sulfuric ester can be obtained.

4. 244 parts of thiodiglycol are mixed and heated in a vacuum with 3,000 parts of an aluminiumhydroxide-paste of 5% strength until no more water distills off. The remaining jelly-like residue may be used for the purposes indicated, either direct or diluted, for instance, with thiodiglycol.

We claim:

1. The process of producing esters of dioxydiethyl sulphide by causing acids to act upon dioxydiethyl sulphide of the formula:

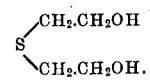

2. As new products, the compounds of the general formula:

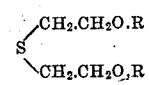

wherein "R" stands for any inorganic or organic acid residues.

In testimony whereof, we affix our signatures.

GEORG KRÄNZLEIN.
MARTIN CORELL.